(12) United States Patent
Lehmann

(10) Patent No.: US 8,074,085 B2
(45) Date of Patent: Dec. 6, 2011

(54) METHOD FOR CONTROLLING THE POWER SUPPLY FROM A POWER SOURCE TO A POWER CONSUMER

(76) Inventor: Erhard Lehmann, Cologne (DE)

( * ) Notice: Subject to any disclaimer, the term of this patent is extended or adjusted under 35 U.S.C. 154(b) by 1307 days.

(21) Appl. No.: 11/662,237

(22) PCT Filed: Sep. 5, 2005

(86) PCT No.: PCT/EP2005/054361

§ 371 (c)(1),
(2), (4) Date: Mar. 8, 2007

(87) PCT Pub. No.: WO2006/027343

PCT Pub. Date: Mar. 16, 2006

(65) Prior Publication Data

US 2008/0074409 A1 Mar. 27, 2008

(30) Foreign Application Priority Data

Sep. 9, 2004 (DE) .......................... 10 2004 044 001

(51) Int. Cl.
*G06F 1/26* (2006.01)
*G06F 1/32* (2006.01)

(52) U.S. Cl. ........ 713/300; 713/320; 713/323; 315/247; 315/307

(58) Field of Classification Search .................. 713/300, 713/320, 323; 315/247, 307
See application file for complete search history.

(56) References Cited

U.S. PATENT DOCUMENTS

| | | | |
|---|---|---|---|
| 5,731,802 A | 3/1998 | Aras et al. | |
| 5,798,743 A | 8/1998 | Bloom | |
| 7,202,607 B2 * | 4/2007 | Kazar et al. | 315/185 S |
| 2002/0047642 A1 * | 4/2002 | Miyagawa | 315/307 |
| 2002/0101198 A1 | 8/2002 | Kemp | |
| 2002/0130885 A1 * | 9/2002 | Lee | 345/600 |
| 2005/0250557 A1 * | 11/2005 | Marschalkowski et al. | 455/574 |
| 2006/0279230 A1 * | 12/2006 | Lee et al. | 315/247 |

FOREIGN PATENT DOCUMENTS

| | | |
|---|---|---|
| EP | 1016062 B1 | 8/2002 |
| EP | 1434194 A1 | 6/2004 |

OTHER PUBLICATIONS

White paper of Artistic Licence (UK) Ltd., Great Britain, dated May 2002, entitled "An overview of the electronic drive techniques for intensity control and colour mixing of low voltage light sources such as LEDs and LEPs", (see www.artisticlicense.com/app%20notes/appnote011.pdf).

* cited by examiner

*Primary Examiner* — Chun Cao
*Assistant Examiner* — Michael J Brown
(74) *Attorney, Agent, or Firm* — Muirhead and Saturnelli, LLC

(57) ABSTRACT

A system and method for controlling power supply of a power source to at least one power consumer to a desired value in the range of from 0 and 100% in which the operating time of the power consumer is divided up into periods and the power output by the power source is switched on within one period only during the duty cycle which is the portion of the period length that corresponds to the desired value. Resolution provided by the present system and method is improved over known techniques for the static division of the period into equally long periods, especially in the control of light modules having low intensities. The present system and method includes the feature in which the period length is divided up into a number of blocks, every block having at least one switch segment in which the switching state can be modified, and at least one static segment in which the switching state cannot be modified.

30 Claims, 2 Drawing Sheets

METHOD FOR CONTROLLING THE POWER SUPPLY FROM A POWER SOURCE TO A POWER CONSUMER

TECHNICAL FIELD

The present application relates to a method for controlling the power supply from a power source to at least one power consumer.

The present application also relates to a computer program product for controlling the power supply from a power source to a power consumer.

BACKGROUND OF THE INVENTION

Numerous methods for controlling the power supply from a power source to a power consumer are known from the related art, where a certain input value is preselected by a control unit. With the digital control units customary today, a binary number is used as the input value, e.g., an 8-bit number which may represent an integer between 0 and 255.

In the method known as pulse width modulation, as described in the white paper of Artistic Licence (UK) Ltd., Great Britain, dated May, 2002, entitled "An overview of the electronic drive techniques for intensity control and colour mixing of low voltage light sources such as LEDs and LEPs", for example, the operating time of the power consumer is divided into successive periods. Each period is first switched on and switched off at a point in time within this period which depends on the setpoint value to be set.

The use of this method for controlling the power supply to light sources, in particular LEDs, via a microcontroller is known from EP 1 016 062 B1, for example.

Pulse width modulation is performed with the help of a counter which is incremented in integral increments up to a maximal value during each period, the control signal being initially set high at the start of each period, i.e., at the lowest count value. This means that the period starts with an ON segment. As soon as the count value corresponds to the brightness setpoint value stored in the register, the control signal is set low, so that the OFF segment of the period is initiated. In this method, a check is performed at each count value of the counter during a period, i.e., typically 255 times in the case of an 8-bit control, to ascertain whether it is necessary to switch from the high control signal to the low control signal. This is very complicated and is associated with the use of a large amount of computation resources for the particular program control. When using the method for illumination control, very short period lengths in the range of a few milliseconds are required to prevent a visible flickering effect. With such short period lengths, most of the computation time available during a period is occupied by checking on whether the system is to be shut down at the next count value. Under some circumstances adequate computation time is no longer available on the microcontroller for implementing other tasks.

An alternative method known as bit angle modulation is also described in the white paper of Artistic Licence (UK) Ltd., Great Britain, referenced above.

With this known method, the period length is divided into fixed blocks of different lengths in the manner of the binary system so that starting with the block of the shortest length, the next-longer block is doubled in length in comparison with the next-shorter block. At the beginning of each block, the control state may be altered. Within the blocks, the control state cannot be altered. Each block may be assigned to a bit within the binary input value. The longest block is assigned to the most significant bit and the shortest block is assigned to the least significant bit. When a bit is occupied with 1 the assigned block is switched on. Due to this combination of switched on and/or switched off blocks, preselected binary input values are directly converted to ON times. Within each block the control state does not change so that no computation time is engaged by the control during the length of each block. The computation time of the microcontroller which is thus free in comparison with pulse width modulation is now available for implementation of other tasks.

In both pulse width modulation and bit angle modulation, the ON period within the period is controllable as a proportional function of a binary input value. In other words, a change in the input value takes place in integral increments, one increment being assigned a fixed segment of time. In the case of an 8-bit input value which may represent integral values between 0 and 255, for example, exactly the same number of ON periods are implemented, the time segment of the ON period for each integral increment of the input value constituting $\frac{1}{255}$ or 0.392% of the entire period.

However, proportional mapping of the input value often does not correspond to the ratio between the power supplied and the perceived increase in intensity. In the case of light sources, for example, the perceived increase in intensity is a logarithmic function of the power supplied. This means that at a low luminous output, even a very minor increase in power supply results in a substantial increase in intensity. At a high luminous output, however, increases in power supply result in less perceived intensity. The same thing also applies to sound sources. When a sound source is operated quietly, a minor increase in power supply results in a great increase in loudness. In a loud environment, however, an increase in power supply results only in a minor increase in loudness.

However, the input value often reflects the subjective output, e.g., the subjectively perceived brightness or loudness. Therefore, tables for mapping the input values via an exponential function are frequently used, so that the power supply increases exponentially and an essentially linear relationship between the input value and the subjectively perceived power (e.g., brightness) is achieved. Mapping via an exponential function in the range of low powers results in very minor changes in power per increment of the input value. The changes are frequently much smaller than the smallest time segment by which the ON period may be varied. In this case, the same ON periods are assigned to different successive input values. On the other hand, at a high power, the resolution of the known methods is too high. A plurality of possible regulating steps is skipped directly with one increment of the original input value by using the table which maps the input values via an exponential function, so that multiple time segments of the ON period are added for each increment at the high power values.

Accordingly, it would desirable to create a method for controlling the power supply from a power source to a power consumer which will permit a high resolution with a low processor load.

SUMMARY OF THE INVENTION

According to the system described herein, a method for controlling the power supply from a power source to at least one power consumer at a setpoint value in the value range between 0% and 100% includes the operating time of the power consumer being divided into periods, the power delivered by the power source being switched on within one period during an ON period amounting to the portion of the period length that corresponds to the setpoint value, and the power delivered by the power source being shut down within the aforementioned period for an off-time which corresponds to the period length minus the ON period, wherein each period is subdivided into a number of blocks, each of the blocks having at least one switchover segment in which the control state may be changed and at least one static segment in which the control state may not be changed.

The control state of each block may be changed only during the switchover segment(s). After the period of time allowed for the switchover segment has elapsed, the static segment follows directly, during which the control state cannot be changed. During the static segment, no data processing steps that control the power supply are required, so the microcontroller is available for other calculations during this period of time.

The switchover segment is preferably situated at the beginning of each block. The block may be switched off for the entire duration of the switchover segment, for example, while the static segment that follows is then switched on. It is also conceivable, for example, to switch the block off only for the fraction of the time provided for the switchover segment. Within the switchover segment, the power supply may be switched on or off at the switching rate of the microcontroller. The rate is predetermined by the clock rate of the microcontroller which is in the megahertz or gigahertz range with today's integrated circuits. Switching times of a few millionths of seconds may be implemented.

It is possible in this way to implement ON periods ranging from zero to the length of the switchover segment and to do so quasi-continuously for the individual blocks. Furthermore, an ON period ranging from the length of the total block length down to the length of the static segment (total block length minus the length of the switchover segment) may be implemented. The situation is similar for the implementable off-times.

The individual blocks of a period may have different ON periods. However, some or all blocks of a period may be switched in the same way so that the ON periods correspond.

By combining blocks having possibly different ON periods, preselected setpoint values may be set with very high precision. Within the switchover segments according to the present invention, a setpoint value having a time resolution close to the processor cycle time may be set. With this high resolution, the switchover segments of all blocks may be varied and consequently an ON period within the period corresponding to the number of blocks times the length of their switchover segments may be implemented with the aforementioned high resolution.

In practice, the length of the static segment may be greater than that of the switchover segment, so that sufficient computation time that may be used for other control tasks is available for the duration of the static segment.

In a practical embodiment of the method, all blocks in a period have the same length, and all switchover segments within the blocks may have the same length. This identical configuration of the individual blocks is an advantage in terms of the control technology because it reduces the programming complexity for setting certain ON periods as a function of corresponding input values. In particular, the case may occur that a high value of the ON period corresponds exactly to the small ON period value times an integer. If the small value is implementable within a block, then in the case of identical blocks the large value may simply be achieved by identical activation of a number of blocks within a period corresponding to the aforementioned integer.

In a practical embodiment, the length of the switchover segments corresponds at least to the length of the static segment divided by the number of blocks in one of the periods.

The ON period of all switchover segments together thus corresponds to the length of a static segment. If the setpoint value stipulates an ON period equal to or slightly greater than the length of a static segment, then a static segment is switched on and, if necessary, a more extensive ON period is implemented within one or more switchover segments. The same thing is also true of an ON period that is equal to or slightly greater than the length of a multiple of the switchover segment. In this case, the aforementioned multiple of static segments is switched on and a portion of the switchover segment(s) is added as needed.

In another practical embodiment of the method according to the present invention, the power supply to multiple power consumers is controlled via multiple control channels, the operating time of each power consumer being divided into periods, blocks, and switchover segments, so that the switchover segments for various channels are offset in time in relation to one another. In this way, the method according to the present invention may run for multiple power consumers on one processor. For example, the periods intended for the particular power consumer may have an offset in time which is equal to or greater than the length of a switchover segment. In this case the processor of a microcontroller may first execute the computation steps required for controlling the switching operations within the switchover segment for the first channel. When this switchover segment ends, the switchover segment of the second channel begins and the processor is available for controlling the switching operations in this switchover segment. The switchover segment for the third channel begins only after the end of the switchover segment for the second channel so that the processor has concluded its processing.

According to the system described herein, a preselected ON period which is a portion of the period length corresponding to the setpoint value may by approximation be composed of one or more blocks within a period that are switched on for the duration of their total length as long as the deviation of the resulting ON period from the preselected ON period is within acceptable limits. If the preselected ON period may no longer be implemented with sufficient accuracy in this way, the ON period of the individual blocks may be altered as described above. In this way the ON period within a period may also by approximation be composed of one or more blocks which are switched on for the duration of a portion of their total length. Furthermore, blocks that are switched on for the duration of their total length may be combined with blocks that are switched on for the duration of a portion of their total length. It is possible in this way to implement, with a high resolution, any ON period that deviates only slightly from the desired setpoint value.

In another practical embodiment of the method according to the present invention, multiple manipulated variables are allocated to each setpoint value, these manipulated variables predetermining the switching points in time for each of the blocks of the period. This makes it possible to reduce the data processing complexity because as many blocks as possible of one period are switched in the same way. The manipulated variables may thus contain a simple specification of the switching points in time and an identification of the blocks that are to be switched at these switching points in time.

Using the present method, as in the related art, an ON period may be implemented in increments, each increment representing a time segment of equal length of the ON period.

In particular, however, with the method according to the system described herein, it is possible to control the ON period at a higher resolution than is the case with an incremental control.

Through appropriate choice of the manipulated variables, any characteristic curves may be implemented. The use of linear characteristic curves is known and is conventional; with these characteristic curves the ratio of the change in input value to the change in intensity is proportional. An incremental binary input value then results in an incremental activation control. For driving light sources in particular, however, a linear characteristic curve is not advantageous because it fails to take into account how the human eye perceives a change in intensity of light. According to the Weber-Fechner law, a change in perception by the human eye to an external change in intensity turns out to be less, the greater the triggering intensity, i.e., the greater the light intensity. This yields a logarithmic relationship between the intensity perceived by the eye and the external light intensity which is determined by the power supply to the light source. Through a suitable choice of manipulated variables, this correlation may be taken into account, which is why the manipulated variables are selected in a practical embodiment of the method in such a way that the ON period within a period has an exponential curve as a function of the input value. Such an exponential characteristic curve takes into account the unique property of the human eye mentioned above. In the range of low luminous outputs at low input values, only minor changes in the ON period are necessary to cause a noticeable change in intensity for the human eye. If one were to work in this range with a linear characteristic curve using an incremental input value, the change in the ON period for one increment would be too large and would cause an excessive increase in brightness for the eye with respect to the change in the input value. In the range of large input values, the situation would be exactly reversed. In this case, the operation with a linear characteristic curve would be too delicate because in this range the human eye would perceive a change in intensity only if it is great enough.

In an embodiment of the method, at least one light source whose brightness is controlled via the quantity of power supplied in each period may be used as the power consumer. Although the brightness of LEDs may also be controlled by varying upstream resistors, such a control is subject to relatively great fluctuations combined with an unfavorable production of heat, in particular in the upstream resistors.

According further to the system described herein, a computer program product is described for controlling the power supply from a power source to at least one power consumer at a setpoint value in the range between 0% and 100%. In an embodiment, this computer program product is capable of running on a digital component using a processor and including the software code segments that define an ON period, which is the portion of the period corresponding to the setpoint value within predetermined periods of the operating time of the power consumer. Software code segments may also be included which generate manipulated variables which assign switching points in time to a number of blocks of equal length into which each period is subdivided, these switching points in time being within a switchover segment of a block, and which assign an invariable control state for at least one static segment within each of the blocks to the aforementioned number of blocks.

The method according to the system described herein is implementable by using a computer running the above-noted computer program product.

Other embodiments of the computer program include the software segments required for performing the method steps described above.

BRIEF DESCRIPTION OF THE DRAWINGS

The method described above will now be described as an example and without restriction on the basis of a device for brightness control of a light module with reference to the accompanying drawing.

DETAILED DESCRIPTION OF VARIOUS EMBODIMENTS

Figure 1:
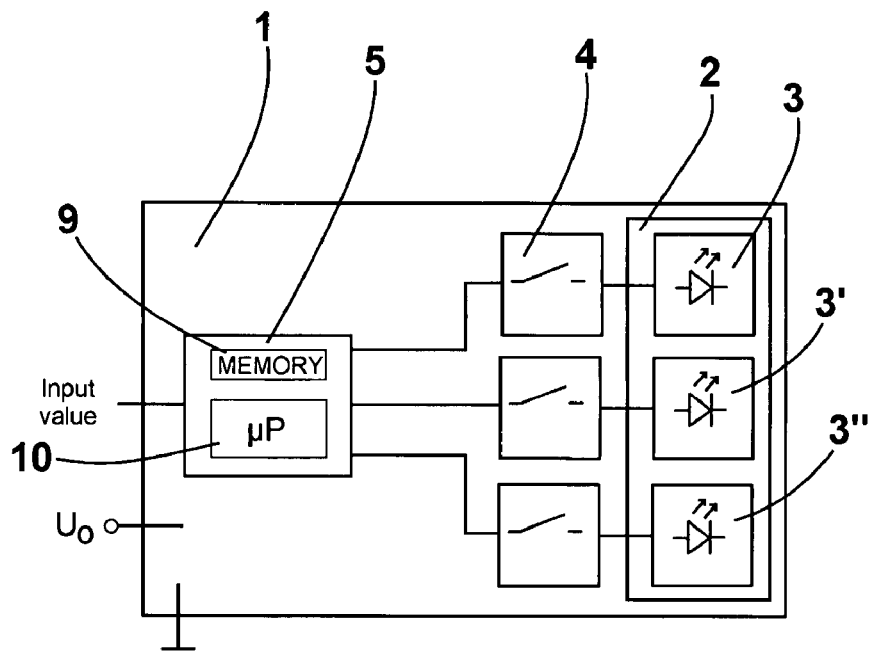
FIG. 1 shows a schematic block diagram of a light module which is controlled according to an embodiment of the system described herein.

FIG. 1 schematically shows a block diagram of a light module 2 which is situated on a circuit board 1 and has three LEDs 3, 3', 3" of three different colors. Although only one LED 3, 3', 3" is shown for each color, a plurality of LEDs 3, 3', 3" of the same color may also be provided for each color, situated in such a way that they are interconnected in a parallel circuit.

Each LED 3, 3', 3" shown here emits light of a different wavelength range. First LED 3 may emit green light, second LED 3' may emit blue light and third LED 3" may emit red light. By additive color mixing, light module 2 may represent any desired color by adjusting different light intensities of different LEDs 3, 3', 3".

Furthermore, FIG. 1 shows the ground potential and power supply voltage $U_0$, ensuring power supply for three LEDs 3, 3', 3". All LEDs 3, 3', 3" are connected to one switch 4 each. Each LED 3, 3', 3" may receive power via switch 4 or may be isolated from the power supply independently of the others. The control state of switch 4 is adjusted via a corresponding control signal which originates from a digital component 5. Digital component 5 is usually a microcontroller. Switch 4 is closed after receiving a positive square wave signal and then causes power to flow to particular LEDs 3, 3', 3", power supply voltage $U_0$ being allowed to flow to the terminals of LEDs 3, 3', 3". The control signals are generated by microcontroller 5, which includes a processor 10 and a memory module 9, via software running on processor 10.

To set a desired percentage ON period, the operating time of corresponding LEDs 3, 3', 3" is divided into periods which are in turn divided into eight blocks of equal length by the program running on processor 10. Each block 3, 3', 3" has three switchover segments and one static segment.

Microcontroller 5 receives from a control unit, e.g., a light panel or a manual regulator, a digital input value as an 8-bit number having a value range between 0 and 255. The program running on processor 10 uses a table that assigns a set of manipulated variables to each individual input value, these manipulated variables defining the total ON period within a period.

The curve of the total ON period with respect to the input value approximates an exponential curve. The smallest time segment implementable via the computer control used here is at least as large as the length of a processor cycle. The length of the processor cycle in the embodiment of the present invention described here amounts to approximately 0.01% of total period length T. This allows a very good approximation to the desired exponential curve. In comparison with pulse width modulation using 255 increments of equal width with an 8-bit input value, the resolution is improved by a factor of approximately 40.

Manipulated variables are assigned to each input value for distribution of the adjustable ON period over the period length T, the program ascertains from the manipulated variables which of the eight blocks of a period are switched on or off at which points in time within the switchover segment. The manipulated variables include for each of the eight blocks in succession, e.g., first the information as to whether the particular switchover segment is switched on or off at the beginning and then the particular number of processor cycles, counting from the beginning of the particular switchover segment, whose control state is to be changed. The processor cycles may be ascertained by the program either by querying a counting register or by executing certain program steps, e.g., program loops having a fixed number of cycles.

Due to these program segments according to the present invention, a characteristic curve is made available in which the ON period approximates an exponential curve in good approximation as a function of the input value so that ultimately an exponential characteristic curve is stored in the program running on processor 10 of microcontroller 5. The basis of the exponential function here is selected according to the present invention in such a way that with an increase in the control value by 25 steps, for example, the ON period is almost doubled. Due to the basis selected in this way, the control may also be performed in the manner of the binary system, which is very advantageous in terms of control technology.

Figure 2:
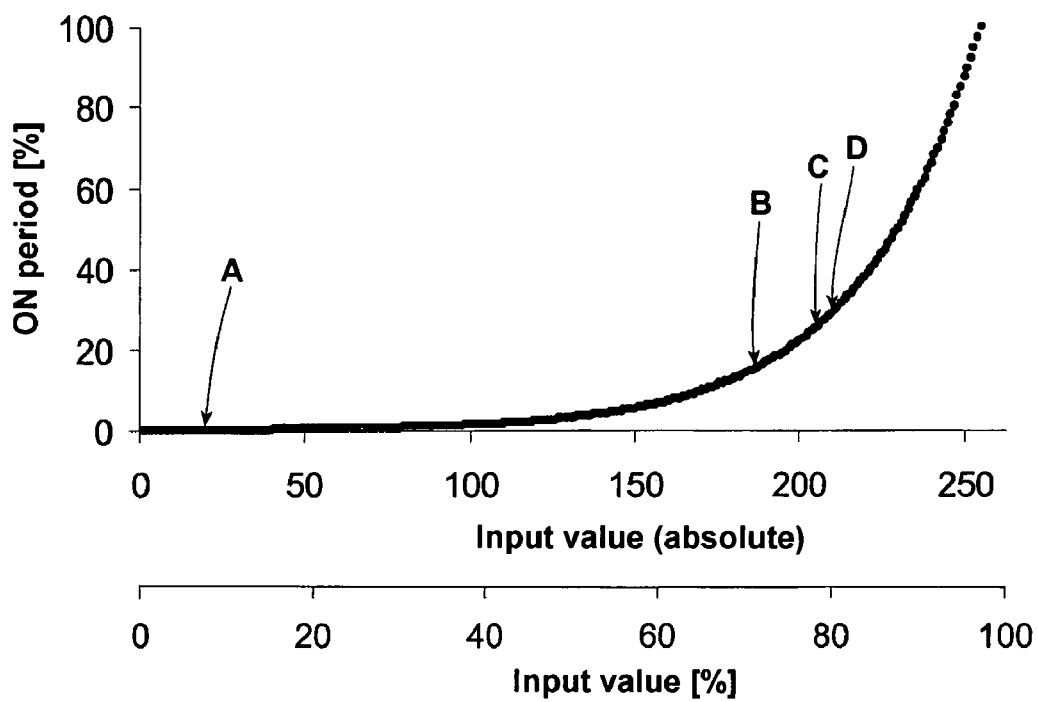
FIG. 2 shows the curve of the ON period as a function of the control value, and FIG. 3 schematically shows the control state within a period for four selected points from FIG. 2.

FIG. 2 shows the course of the characteristic curve resulting from the program segments described above. This shows the ON period as a function of the input value (absolute and percentage). At an input value of 0, the ON period is 0 whereas at the largest input value of 255, the period is switched on for the duration of its total length to achieve the greatest possible light intensity.

Figure 3:
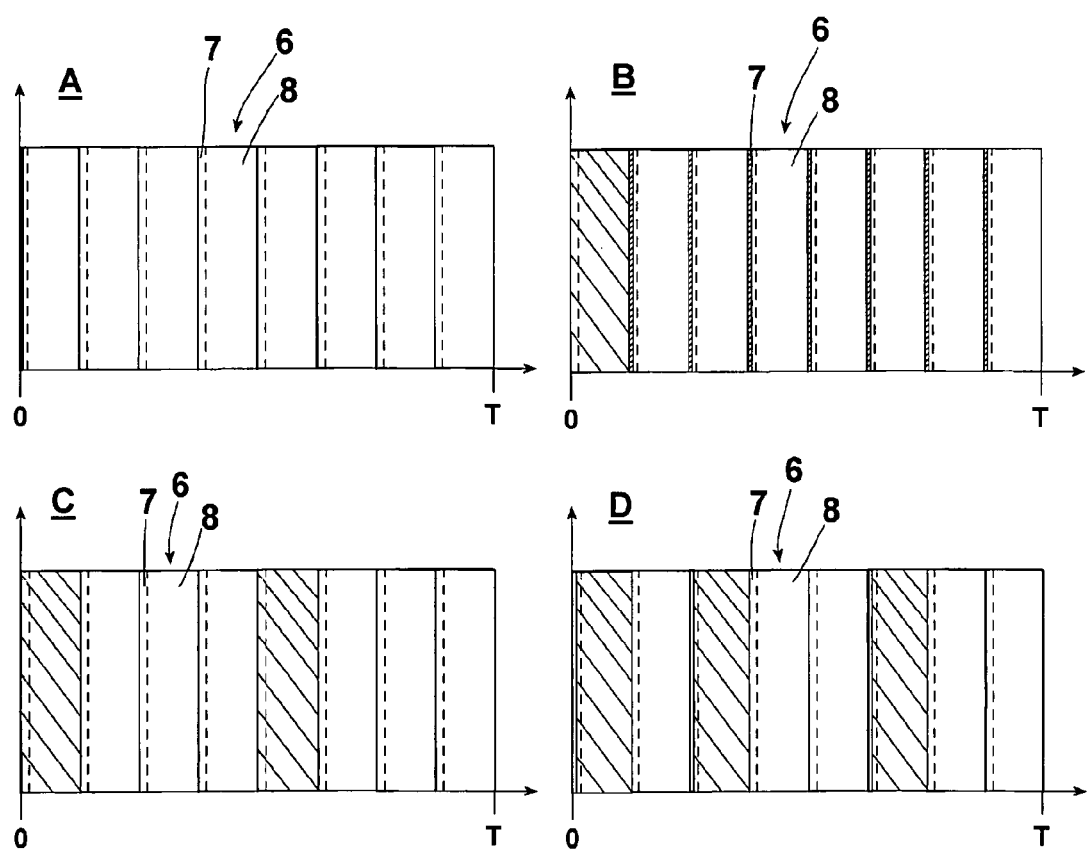

In FIG. 3, schematic diagrams are assigned to points A, B, C and D of the characteristic curve from FIG. 2, showing which of the eight blocks 6 of equal length of the period having total time T are switched on to adjust a predetermined ON period for an LED 3, 3', 3". Each of eight blocks 6 has a switchover segment 7 at the beginning, the length of which amounts to at least ⅛ of the length of static segment 8 of block 6. During the length of switchover segment 7, the control state may be varied, i.e., the power supply may be switched on or off by switch 4.

The remaining portion of the block includes a static segment 8 during the length of which the control state cannot be altered.

Within the switchover segment, it is possible to switch with a high time resolution that is limited by the processor cycle alone. In practice, at the lowest input values between 0 and 10, a change of approximately 0.01% in the ON period may be implemented by displacement of the switch-off times by one processor cycle. The change from one input value to the next increases exponentially, so that it amounts to 2.8% with the last step (254 to 255). A corresponding increase in the subjectively perceived brightness follows from this for any increase in the input value by a certain amount.

During the length of static segments 8 shown here, processor 10 is free for other tasks because during static segment 8, no change in the control state is allowed. Therefore, three independent control methods may be executed on the processor in parallel according to the present invention, allowing multiple control channels for controlling the power to multiple power consumers, for example. Blocks 6 and switchover segments 7 of the various channels are to be shifted in relation to one another, so that switchover segments 7 of the different channels are in static segments 8 of the respective other channels. For driving the other LEDs 3' and 3", time-staggered periods T and blocks 6 may therefore be implemented according to the identical method. A switchover segment for the second channel, i.e., for second LED 3', follows directly after the switchover segment for the first channel, i.e., for first LED 3. The switchover segment for third LED 3" follows the switchover segment for second LED 3'. During the length of switchover segments 7 mentioned above, microcontroller 5 switches only one of three switches 4 (see FIG. 1). For each LED 3, 3', 3", the periods are divided according to the diagram in FIG. 3.

It is sufficient that the length of a switchover segment 7 corresponds to the length of a static segment 8 divided by the number of blocks. Each ON period below the length of a static segment 8 may be implemented by varying the switching points in time within switchover segments 7, all static segments 8 being switched off. For an ON period longer than the length of a static segment 8 and shorter than the length of two static segments 8, a completely switched-on static segment 8 may be combined with suitable switching points in time within switchover segments 7 in the blocks of the period, etc.

Only during the length of switchover segments 7 is processor 10 fully busy with the program steps for power control for switching the switches 4 on and off. During the length of static segments 7, no switching may be performed. The computation time of processor 10 is available for other control tasks (e.g., another control channel) during this period of time.

In the case of a single-channel control having 8 blocks within a period, as illustrated in FIG. 3, the length of the switchover segment in each block may amount to ⅛ of the block length and the length of the static segment may amount to ⅞ of the block length. The length of switchover segment 7 thus amounts to less than 12% of the block length. Consequently the processor is fully busy with the program steps for power control of a channel for only less than 12%. More than 88% is available for other tasks. With the three-channel control described above, in which three controls are implemented in one processor in chronological order, approximately 33% of the computation time must be used for control while more than 66% is available for other tasks. To simplify the programming, switchover segments 7 may also be selected to be somewhat longer than ⅛ of the block length. However, this causes a decline in the amount of freely available computation time.

During switchover segments 7, ON periods and/or off-times may be implemented with a resolution of approximately one processor cycle, which at the present time amounts to approximately 0.01% of total period T; therefore, preselected activation times may be adjusted very accurately through a suitable combination of switching points in time within blocks 6. For example, by using the program according to the present invention, the ON period of point A (input value 18) of the characteristic curve (see FIG. 2) corresponding to 0.14% of total period length T is implemented by only briefly switching on and off switchover segment 7 of the first of eight blocks 6. To adjust the ON period of point B (control value 190) corresponding to 16.49% of total period length T, first block 6 is switched on for the duration of its total length, corresponding to 12.5% of period length T (identified by hatching). The remaining time is uniformly divided among the remaining seven blocks 6, switching on for a corresponding interval of time (shown with hatching) in their switchover segments 7.

For point C (control value 205, ON period 25% of period length T), first and fifth blocks 6 are completely switched on. Point D (control value 218, ON period 35.82% of period length T) of the characteristic curve shown in FIG. 2 is implemented by switching on first, third and sixth blocks 6. Since a total ON period of 37.5% of period length T is obtained with these three blocks, each block within the switchover segment is switched on only after a period of time has elapsed corresponding to 0.56% of total period length T.

A predefined ON period may be adjusted very accurately by switchover segments 7 according to the present invention, the accuracy being limited only by the processor cycle time of microcontroller 5. The very minor changes in the ON period in the range of low input values (see also the characteristic curve in FIG. 2) may thus also be implemented with a conventional 8-bit control, whereas the controls known from the related art with the addition of fixed time segments per unit of the input value for approximation of such characteristic curves must rely on complex 16-bit controls. Since the ON period according to FIG. 2 is increased exponentially as a function of the input value by the program of microcontroller 5, there is a linear increase in intensity perceived by the human eye according to the Weber-Fechner law, which was explained above, there being a logarithmic correlation between the intensity perceived by the human eye and the external light intensity. Additional conversion modules with mapping tables which map the input value via an exponential function before it is sent to microcontroller 5 may thus be omitted.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for controlling a power supply via several control channels from a power source to at least one power consumer at a setpoint value in the value range between 0% and 100%, comprising:
    dividing an operating time of the power consumer into periods;
    switching on power delivered by the power source within a period during an ON period that is a portion of a period length corresponding to the setpoint value; and
    switching off the power supplied by the power source within the period during an off-time which corresponds to the period length minus the ON period, wherein each period is divided into a number of blocks, each block having at least one switchover segment in which a control state may be changed and at least one static segment in which the control state cannot be changed, wherein the switchover segments are offset in time relative to one another for different channels.

2. The method as recited in claim 1, wherein the duration of the static segment is greater than that of the switchover segment.

3. The method as recited in claim 1, wherein all blocks in a period have the same length.

4. The method as recited in claim 3, wherein the switchover segments of all blocks of a period have the same length.

5. The method as recited in claim 4, wherein the length of the switchover segment is at least equal to the length of the static segment divided by the number of blocks in a period.

6. The method as recited in claim 1, wherein the power supply to several power consumers is controlled via several control channels, the operating time of each power consumer being divided into periods, blocks and switchover segments.

7. The method as recited in claim 1, wherein the ON period within a period is composed approximately of one or more blocks that are switched on for the duration of their total length.

8. The method as recited in claim 1, wherein the ON period within a period is by approximation composed of one or more blocks that are switched on for the duration of a portion of their total length.

9. The method as recited in claim 1, wherein the ON period within a period is by approximation composed of two or more blocks, a portion of which is switched on for the duration of their total length and the other portion of which is switched on for the duration of a portion of their total length.

10. The method as recited in claim 1, wherein multiple manipulated variables that stipulate the switching points in time for each block of the period are assigned to each setpoint value.

11. The method as recited in claim 10, wherein the manipulated variables are assigned as a function of an input value so that the ON period within a period, plotted against the input value, follows an exponential curve.

12. The method as recited in claim 1, wherein at least one light source is used as the power consumer, a brightness of the light source being controlled via the quantity of power supplied in each period.

13. The method as recited in claim 1,
    wherein the duration of the static segment is greater than that of the switchover segment,
    wherein all blocks in a period have the same length,
    wherein the switchover segments of all blocks of a period have the same length,
    wherein the length of the switchover segment is at least equal to the length of the static segment divided by the number of blocks in a period,
    wherein the power supply to several power consumers is controlled via several control channels, the operating time of each power consumer being divided into periods, blocks, and switchover segments in such a way that the switchover segments are offset in time relative to one another for different channels,
    wherein the ON period within a period is by approximation composed of one or more blocks that are switched on for the duration of a portion of their total length,
    wherein multiple manipulated variables that stipulate the switching points in time for each block of the period are assigned to each setpoint value,
    wherein the manipulated variables are assigned as a function of an input value so that the ON period within a period, plotted against the input value, follows an exponential curve,
    wherein at least one light source is used as the power consumer, a brightness being controlled via the quantity of power supplied in each period.

14. A computer program product, stored on a non-transitory computer-readable medium, for controlling the power supply via several control channels from a power source to at least one power consumer at a setpoint value in the value range between 0% and 100%, the computer program product being able to run on a digital component having a processor and including:
    software code sections that define an ON period within preselected periods of the operating time of the power consumer, this ON period being the portion of the period length corresponding to the setpoint value; and
    software code sections that create manipulated variables which assign switching points in time to a number of blocks into which each period is subdivided, each being within a switchover segment of a block, and assign an invariable control state for at least one static segment within each of the blocks to the aforementioned number of blocks, wherein the switchover segments are offset in time relative to one another for different channels.

15. The computer program product as recited in claim 14, wherein the duration of the static segment is greater than that of the switchover segment.

16. The computer program product as recited in claim 14, wherein all blocks in a period have the same length.

17. The computer program product as recited in claim 16, wherein the switchover segments of all blocks of a period have the same length.

18. The computer program product as recited in claim 14, wherein the power supply to several power consumers is controlled via multiple control channels, the operating time of each power consumer being divided into periods, blocks, and switchover segments.

19. The computer program product as recited in claim 14, wherein due to the manipulated variables, the ON period is by approximation composed of one or more blocks within a period, which are switched on for the duration of their total length.

20. The computer program product as recited in claim 14, wherein due to the manipulated variables, the ON period is by approximation composed of one or more blocks within a period, which are switched on for the duration of a part of their total length.

21. The computer program product as recited in claim 14, wherein due to the manipulated variables, the ON period is by approximation composed of two or more blocks within a period, a portion of which are switched on for the duration of their total length and the other portion of which are switched on for the duration of a portion of their total length.

22. The computer program product as recited in claim 14, wherein the manipulated variables are assigned as a function of an input value, so that the ON period within a period plotted against the input value follows an exponential curve.

23. The computer program product as recited in claim 14 wherein the ON period of the power supply to at least one light source is controlled.

24. A microcontroller for controlling the power supply from a power source to at least one power consumer, the microcontroller having at least one processor, wherein the computer program product as recited in claim 14 runs on the processor.

25. A light module having a microcontroller as recited in claim 24 for controlling the power supply from a power source to at least one light source.

26. The light module as recited in claim 25, wherein the light source is an LED.

27. The computer program product as recited in claim 14,
wherein the duration of the static segment is greater than that of the switchover segment,
wherein all blocks in a period have the same length,
wherein the switchover segments of all blocks of a period have the same length,
wherein the power supply to several power consumers is controlled via multiple control channels, the operating time of each power consumer being divided into periods, blocks, and switchover segments, so that the switchover segments are offset in time in relation to one another for different channels,
wherein due to the manipulated variables, the ON period is by approximation composed of one or more blocks within a period, which are switched on for the duration of a part of their total length,
wherein the manipulated variables are assigned as a function of an input value, so that the ON period within a period plotted against the input value follows an exponential curve,
wherein the ON period of the power supply to at least one light source is controlled.

28. A method for controlling a power supply via several control channels from a power source to a power consumer, comprising:
dividing an operating time of the power consumer into a plurality of periods;
switching on power delivered by the power source within at least one period of the plurality of periods during an ON period that is at least a portion of a period length of the at least one period; and
switching off the power supplied by the power source within the at least one period during an OFF period which corresponds to the period length minus the ON period, wherein the at least one period is divided into a plurality of blocks, at least one of the blocks having at least one switchover segment in which a control state may be changed and at least one static segment in which the control state cannot be changed, wherein the switchover segments are offset in time relative to one another for different channels.

29. A system including at least one processor that performs the method of claim 28.

30. A computer program product, stored in a non-transitory computer readable medium, having software code the performs the method of claim 28.

* * * * *